(12) United States Patent
Quinn et al.

(10) Patent No.: US 9,155,420 B2
(45) Date of Patent: Oct. 13, 2015

(54) BEVERAGE BREWING APPARATUS AND METHOD

(75) Inventors: Anthony Edward Quinn, Sharnbrook (GB); Marco Karreman, Vlaardingen (NL); Tjeerd Jan Pieter Gerbranda, Delft (NL); Edwin Jeroen Muller, Delft (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/704,999

(22) PCT Filed: Jun. 23, 2011

(86) PCT No.: PCT/EP2011/060539
§ 371 (c)(1),
(2), (4) Date: Feb. 5, 2013

(87) PCT Pub. No.: WO2012/007258
PCT Pub. Date: Jan. 19, 2012

(65) Prior Publication Data
US 2013/0129886 A1 May 23, 2013

(30) Foreign Application Priority Data
Jul. 14, 2010 (EP) .................................... 10169487

(51) Int. Cl.
*A47J 31/60* (2006.01)
*A47J 31/00* (2006.01)
*A47J 31/18* (2006.01)

(52) U.S. Cl.
CPC ............... *A47J 31/60* (2013.01); *A47J 31/002* (2013.01); *A47J 31/18* (2013.01)

(58) Field of Classification Search
USPC .............................. 426/431, 433; 99/300, 285
See application file for complete search history.

(56) References Cited

U.S. PATENT DOCUMENTS

| 2,660,948 A | | 12/1953 | Forschner et al. | |
|---|---|---|---|---|
| 3,385,569 A | * | 5/1968 | Bookout | .................... 366/165.1 |
| 3,446,399 A | * | 5/1969 | Ross et al. | ................. 222/129.1 |

(Continued)

FOREIGN PATENT DOCUMENTS

| CN | 1640350 | 7/2005 |
|---|---|---|
| CN | 1835702 | 9/2006 |

(Continued)

OTHER PUBLICATIONS

Mechanical English translation of JP 6-314375, published Nov. 1994.*

(Continued)

*Primary Examiner* — Anthony Weier
(74) *Attorney, Agent, or Firm* — Gerald J. McGowan, Jr.

(57) ABSTRACT

The present invention has as an objective to provide an apparatus for brewing a beverage that provides an attractive brewing experience for the consumer, which can perform an effective and efficient brewing process, and which also can be easily rinsed to remove any spent infusible material. These objectives have been met by a beverage brewing machine having an at least one water inlet port that is arranged at an angle of less than 4 degrees relative to the wall of the brew chamber to direct water around the wall of the brew chamber. The apparatus also provides for improved agitation of infusible material. Moreover a method is provided to brew a beverage using the brewing machine of the invention.

31 Claims, 6 Drawing Sheets

(56) References Cited

U.S. PATENT DOCUMENTS

| | | |
|---|---|---|
| 3,823,656 A | 7/1974 | Vander Veken |
| 3,971,305 A | 7/1976 | Daswick |
| 4,410,550 A | 10/1983 | Gaskill |
| 2,827,845 A | 3/1985 | Richeson |
| 4,644,855 A | 2/1987 | Woolman et al. |
| 4,826,695 A | 5/1989 | Tanner |
| 4,882,983 A | 11/1989 | Pastrick |
| 4,898,090 A | 2/1990 | Chan |
| 4,920,871 A | 5/1990 | Anson et al. |
| 4,967,647 A | 11/1990 | King et al. |
| 4,984,511 A * | 1/1991 | Sekiguchi .................. 99/287 |
| 5,259,298 A | 11/1993 | King |
| 5,349,897 A | 9/1994 | King et al. |
| 5,393,540 A * | 2/1995 | Bunn et al. .................. 426/231 |
| 5,406,882 A | 4/1995 | Shaanan |
| 5,460,078 A | 10/1995 | Weller et al. |
| 5,479,849 A | 1/1996 | King et al. |
| 5,623,864 A | 4/1997 | Moore et al. |
| 5,636,563 A | 6/1997 | Oppermann et al. |
| 5,896,805 A | 4/1999 | Katou et al. |
| 5,913,963 A * | 6/1999 | King .......................... 99/302 P |
| 5,947,004 A | 9/1999 | Huang |
| 6,142,063 A | 11/2000 | Beaulieu et al. |
| 6,887,506 B2 | 5/2005 | Kalenian et al. |
| 7,226,631 B2 * | 6/2007 | Thakur et al. ................ 426/477 |
| 7,351,576 B1 | 4/2008 | Harmon et al. |
| 7,922,382 B2 * | 4/2011 | Thakur et al. ............. 366/137.1 |
| 2001/0043954 A1 | 11/2001 | Sweet |
| 2002/0152895 A1 | 10/2002 | Duffy et al. |
| 2003/0213369 A1 | 11/2003 | Hall et al. |
| 2003/0233946 A1 | 12/2003 | Cirigliano et al. |
| 2004/0065209 A1 | 4/2004 | Piazza |
| 2004/0118290 A1 | 6/2004 | Cai |
| 2005/0126401 A1 | 6/2005 | Streeter et al. |
| 2005/0150390 A1 | 7/2005 | Schifferle |
| 2006/0174773 A1 | 8/2006 | Taylor et al. |
| 2006/0230946 A1 | 10/2006 | Cheng et al. |
| 2007/0034083 A1 | 2/2007 | Van Hattem et al. |
| 2007/0186780 A1 | 8/2007 | Clark |
| 2008/0026121 A1 | 1/2008 | Mastropasqua et al. |
| 2008/0050480 A1 | 2/2008 | Doglioni Majer et al. |
| 2008/0072766 A1 | 3/2008 | Kobylarz |
| 2008/0095903 A1 | 4/2008 | Weijers |
| 2008/0166463 A1 | 7/2008 | Green et al. |
| 2008/0206418 A1 | 8/2008 | Ranzoni |
| 2008/0210098 A1 | 9/2008 | Weijers et al. |
| 2008/0302250 A1 | 12/2008 | Duineveld et al. |
| 2008/0302252 A1 | 12/2008 | O'Brien et al. |
| 2009/0101022 A1 | 4/2009 | Levin |
| 2010/0173057 A1 | 7/2010 | Gugerli et al. |

FOREIGN PATENT DOCUMENTS

| | | |
|---|---|---|
| CN | 101600378 | 2/2009 |
| CN | 101600378 | 12/2009 |
| DE | 102007028674 | 8/2008 |
| EP | 0249700 | 12/1987 |
| EP | 0272922 | 6/1988 |
| EP | 0296478 | 12/1988 |
| EP | 0449533 | 10/1991 |
| EP | 0483244 | 5/1992 |
| EP | 0613646 | 9/1994 |
| EP | 0638486 | 2/1995 |
| EP | 0808598 | 5/1997 |
| EP | 0812557 | 12/1997 |
| EP | 0812558 | 12/1997 |
| EP | 1010385 | 6/2000 |
| EP | 1365657 | 12/2003 |
| EP | 1440913 | 6/2006 |
| EP | 1795093 | 6/2007 |
| EP | 1767467 | 4/2009 |
| EP | 1986934 | 11/2011 |
| GB | 1040095 A | 8/1966 |
| GB | 1164760 | 9/1969 |
| GB | 1316686 | 5/1973 |
| GB | 2217976 | 11/1989 |
| JP | 6-314375 | * 11/1994 |
| JP | 2001275842 | 10/2001 |
| JP | 2007004264 | 1/2007 |
| JP | 2007004264 A | 1/2007 |
| WO | WO8605670 | 10/1986 |
| WO | WO8802612 A1 | 4/1988 |
| WO | WO9101673 | 2/1991 |
| WO | WO9826698 | 6/1998 |
| WO | WO0028867 | 5/2000 |
| WO | WO0158786 | 8/2001 |
| WO | WO0243540 A1 | 6/2002 |
| WO | WO03073896 | 9/2003 |
| WO | WO03082065 A1 | 10/2003 |
| WO | WO2005004682 | 1/2005 |
| WO | WO2006066626 | 6/2006 |
| WO | WO2006137737 | 12/2006 |
| WO | WO2007042485 A1 | 4/2007 |
| WO | WO2009081427 | 7/2009 |
| WO | WO2009135177 A1 | 11/2009 |
| WO | WO2010059251 A1 | 5/2010 |

OTHER PUBLICATIONS

PCT Written Opinion PCT/EP2011/060539 dated Jul. 28, 2011.
PCT International Search Report dated Jul. 28, 2011.
EP Search Report dated Dec. 3, 2010.
Co-Pending U.S. Appl. No. 13/704,998; Deposited Dec. 18, 2012; entitled: Method for Brewing Beverage and Cartridge Containing Infusible Material.
Search Report in CN201180032483 Translation, Aug. 22, 2014.
Search Report in EP10169485, Dec. 8, 2010.
Search Report in PCTEP2011060538, Jul. 26, 2011.
Written Opinion in PCTEP2011060538, Jul. 26, 2011.
IPRP2 in PCTEP2011060539, Jun. 27, 2012.

* cited by examiner

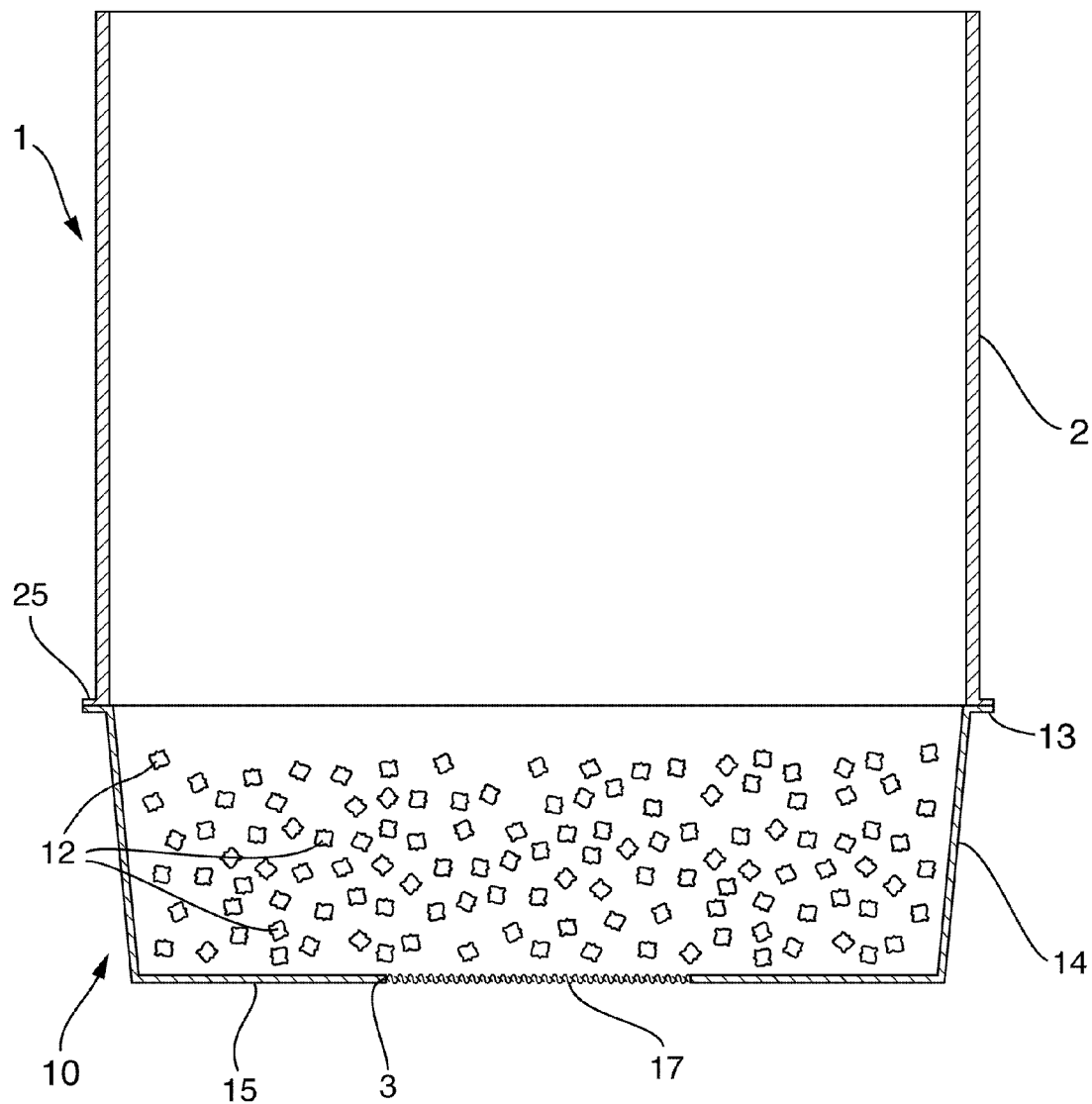

BEVERAGE BREWING APPARATUS AND METHOD

TECHNICAL FIELD OF THE INVENTION

The present invention relates to beverage brewing machines that are suitable for consistently providing individual servings of a multiplicity of freshly brewed beverages.

BACKGROUND AND PRIOR ART

With the exception of water, tea is the most widely consumed of all beverages. Its world-wide per capita consumption has been estimated at 0.1 liter per day. Furthermore, other brewed beverages such as fruit infusions, iced tea and coffee are increasingly consumed world-wide. In western countries, brewed beverages tend to be prepared at home, however, there is a growing trend for consumers to consume such beverages out of the home in, for example, cafes and bars. It is thought that consumers prefer to enjoy a beverage-brewing experience that involves more than being supplied with infusible materials and hot water. There is therefore a need for an alternative brewing method.

Beverage brewing machines are known. For example, United Stated patent application published as U.S. 2007/0034083 discloses a brewing device for the preparation of beverages such as coffee, tea, roasted-barley coffee, camomile tea and similar brews and infusions. In one embodiment, hot water contained in a hopper flows down through a valve to produce a kind of Umbrellas effect to urge the down-flowing water against the walls of the brew chamber, thereby cleaning them from the brewing residues. However, the use of such 'umbrella' showers is ineffective and requires large amounts of water.

U.S. Pat. No. 2,827,845 discloses a beverage making machine, which comprises a tangential water or air inlet or tuyere in the lower part of the brewing chamber, and a flush system comprising tangentially oriented nozzles or tuyeres in the upper end of the brewing chamber.

GB 1,040,095 discloses a beverage brewing apparatus in which the brewing water and air enter the brewing chamber through an opening which is substantially tangential with the wall.

WO 02/43540 discloses a tea brewing machine that has a housing, a vessel for receiving leaf tea, hot water supply means for supplying hot water to the vessel, means for physically agitating the leaf tea within the vessel to maximise the rate and extent of infusion, and a siphon arrangement for siphoning the infusion out of the vessel before it is dispensed. In one embodiment hot water is pumped into the brewing vessel as water jets.

While such a machine functions well there are disadvantages with regard to the efficacy of the brewing process including the removal of the entire brew vessel between servings for cleaning and for the addition of ingredients for a new serving. In addition, the use of the water jets directed into the brewing vessel from above requires high operating pressure.

The present invention is directed to preferably one or more of the following objectives.

It is an object of the present invention to provide a beverage brewing apparatus that is simple to operate, comprises few moving parts, and can perform an effective and efficient brewing process, It is an object of the present invention to provide a beverage brewing apparatus that is suitable for consistently providing individual servings of a multiplicity of freshly brewed beverages and that provides an effective rinsing step in order to prevent flavour carry over between individual brews.

It is an object of the present invention to provide a beverage brewing apparatus that provides an attractive brewing experience for the consumer.

BRIEF DESCRIPTION OF THE INVENTION

We have now found that individual servings of a multiplicity of freshly brewed beverages may be provided using a brewing apparatus that is simple to operate and comprises few moving parts. By using and operating the apparatus one or more of the above objectives are met. Moreover, it was found improved rinsing is achieved through introducing water into a brew chamber of a beverage brewing machine by using a water inlet port which directs water to flow around the wall of the brew chamber. In particular, it was found that an improved brewing process, for example with improved agitation is achieved when such a water inlet port is combined with an agitation means to agitate the infusible materials with air or water.

Accordingly, in a first aspect, the present invention provides a beverage brewing machine comprising an at least one water supply, and a brew chamber wherein the brew chamber is delimited by a wall and a base,
wherein the chamber also comprises an outlet port and at least one water inlet port in communication with the at least one water supply
wherein
the at least one water inlet port is arranged at an angle ($\theta$ theta) of less than 45 degrees relative to the wall
to direct inlet water around the wall of the brew chamber;
characterised in that
  a. the brewing machine further comprises an air pump and
    the chamber also comprises at least one fluid outlet port in communication with the air pump,
    and/or
  b. the brewing machine further comprises at least one lower water inlet port, positioned below the at least one inlet port and arranged at an angle (alpha $\alpha$) of at least 45 degrees relative to the wall.

It has been found that the introduction of water into the brew chamber in this way results in more effective rinsing and cleaning of the brew chamber and requires less water and fewer complex moving parts than conventional beverage brewing machines. Moreover, it has been found that combining a water inlet port arranged to direct inlet water around the wall of the brew chamber with an agitation means, which agitates infusible materials in the brewing water either by air or by water flow, leads to additional benefits, such as improved agitation, reduction of waste water, reduction of water spillage during brewing and a brewing process which looks more attractive to the consumer.

In a second aspect, the invention provides a method for brewing beverages comprising the steps in the following order of:
  introducing infusible materials into a brew chamber having a wall;
  supplying water to the brew chamber;
  allowing the infusible materials to mix with water thereby to form a brew liquor;
  allowing the brew liquor to empty from the brew chamber; and
  supplying a dose of water to the brew chamber via the at least one water inlet port; characterised in that the dose of water is directed around the wall thereby to rinse the brew chamber.

Definitions

Beverage

As used herein the term 'beverage' refers to a substantially aqueous drinkable composition suitable for human consumption. Preferably the beverage comprises at least 85% water by weight of the beverage, more preferably at least 90% and most preferably from 95 to 99.9%.

Infusible Material

As used herein the term 'infusible material' refers to substances that when mixed with aqueous liquid release certain substances into the liquid thereby to form a beverage.

Brewing

As used herein, the term 'brewing' refers to the addition of a liquid to an infusible material thereby to form a beverage. Brewing may be carried out at any temperature but is preferably carried out at least 40° C., more preferably at least 55° C., more preferably at least 70° C., more preferably at least 80° C., and preferably less than 120° C., more preferably less than 100° C., more preferably still less than 95° C. Alternatively the water temperature may be kept at ambient temperature or even cooled to a temperature to below ambient temperature, in order to brew a cool beverage, such as ice tea.

Brew Liquor

As used herein the term 'brew liquor' refers to the beverage formed from the result of the brewing process whereby certain substances are released from the infusible material into the liquid thereby to form the brew liquor.

Agitation

As used herein, the term 'agitation' refers to the process whereby the infusible material and liquid are mixed. Agitation may be realised by mechanical means (e.g. by stirring), or by the action of water (herein referred to as 'water agitation'), or by the action of air (herein referred to as 'air agitation').

Rinsing

As used herein, the term 'rinsing' refers to the removal of infusible materials or brew liquor residue from any apparatus associated with the brewing process, in particular a brew chamber.

Tea

As used herein the term 'tea' refers to leaf material from *Camellia sinensis* var. *sinensis* or *Camellia sinensis* var. *assamica*. It also includes rooibos obtained from *Aspalathus linearis*. 'Tea' is also intended to include the product of blending two or more of any of these teas. The leaf material may be substantially fermented i.e. black tea, semi-fermented i.e. oolong tea, or substantially unfermented i.e. green tea. The tea could be a flavoured and/or spiced tea.

Leaf Tea

As used herein the term 'leaf tea' refers to a tea product that contains one or more tea origins in a substantially un-infused form.

Tea-Based Beverage

As used herein, the term 'tea-based beverage' refers to a beverage comprising at least 0.01% by weight tea solids. Preferably the tea-based beverage comprises from 0.04 to 3%, more preferably from 0.06 to 2%, most preferably from 0.1 to 1% by weight tea solids.

Tangential

As used herein, the term 'tangential' has the same meaning as would be understood by the person skilled in the art i.e. it refers to a line that may be drawn on a curve at any given point that is a straight line touching the curve at that point. In the simplest example of a curve, i.e. a circle, any straight line touching the curve at a 90 degree angle to the radius is "tangential". The term 'substantially tangential' refers to a straight line touching a curve that is within 15 degrees of a line that is tangential to the curve, preferably within 10 degrees, most preferably within 5 degrees.

Infusible Material Particle Size and Grade

For the purposes of the present invention, infusible material particle size is characterised by sieve mesh size using the following convention: Tyler mesh sizes are used throughout; A "+" before the sieve mesh indicates the particles are retained by the sieve; A "−" before the sieve mesh indicates the particles pass through the sieve. For example, if the particle size is described as −5+20 mesh, then the particles will pass through a 5 mesh sieve (particles smaller than about 4.0 millimeter) and be retained by a 20 mesh sieve (particles larger than about 841 micrometer).

Leaf particle size may additionally or alternatively be characterized using the grades listed in the international standard ISO 6078-1982. These grades are discussed in detail in our European patent specification EP 1 365 657 B1 (especially paragraph [0041] and Table 2) which is hereby incorporated by reference.

For the avoidance of doubt, the word 'comprising' is intended to mean including but not necessarily 'consisting of' or 'composed of'. In other words, the listed options or steps need not be exhaustive.

All numbers in this description indicating amounts or temperatures of material may optionally be understood as modified by the word 'about'.

DESCRIPTION OF THE DRAWINGS

The following figures are illustrative of the present invention, and are not considered to be limiting the present invention.

FIG. 9 shows a part of a preferred brew chamber with a base that is formed by a cartridge.

DETAILED DESCRIPTION OF THE INVENTION

Figure 1:
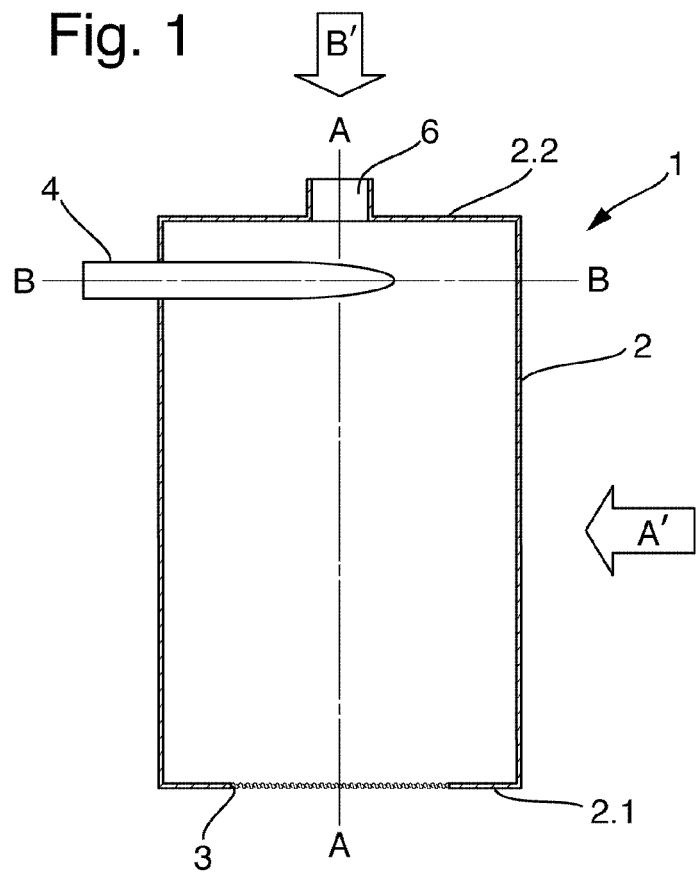
FIG. 1 shows a projection view of part of a first preferred embodiment of the beverage brewing machine of the present invention.

The present invention is directed to beverage brewing machines having improved rinsing. The present invention is directed to beverage brewing machines able to consistently provide individual servings of a multiplicity of freshly brewed beverages.

With reference to FIGS. 1 to 7, in a first aspect the present invention provides a beverage brewing machine comprising an at least one water supply, and a brew chamber 1 wherein the brew chamber 1 is delimited by a wall 2 and a base 2.1, wherein the chamber also comprises an outlet port 3 and at least one water inlet port 4 in communication with the at least one water supply
wherein
the at least one water inlet port 4 is arranged at an angle (θ theta) of less than 45 degrees relative to the wall 2
to direct inlet water around the wall 2 of the brew chamber 1; characterised in that
   a. the brewing machine further comprises an air pump and the chamber 1 also comprises at least one fluid outlet port 6 in communication with the air pump,
   and/or
   b. the brewing machine further comprises at least one lower water inlet port 5, positioned below the at least one inlet port 4 and arranged at an angle (alpha α) of at least 45 degrees relative to the wall 2.

Figure 2:
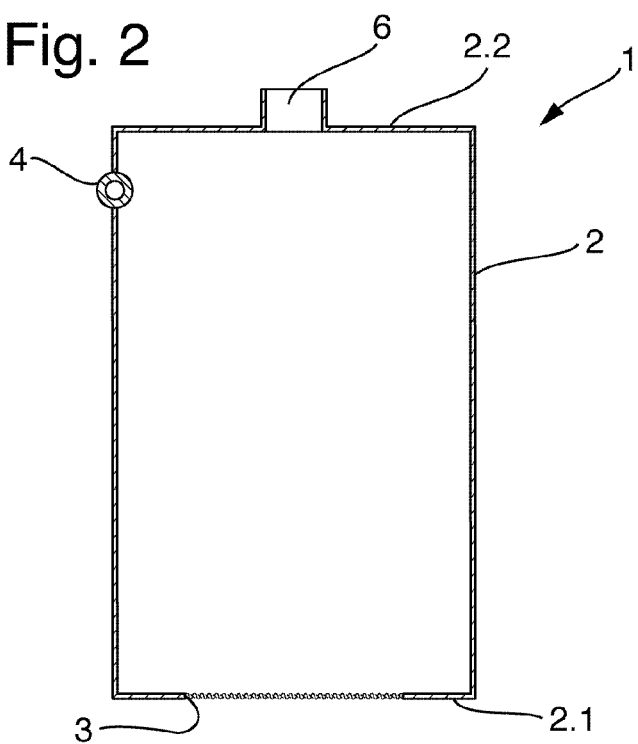
FIG. 2 shows a cross section along line A-A, viewed from the direction indicated by arrow A' of the beverage brewing machine of FIG. 1.
Figure 3:
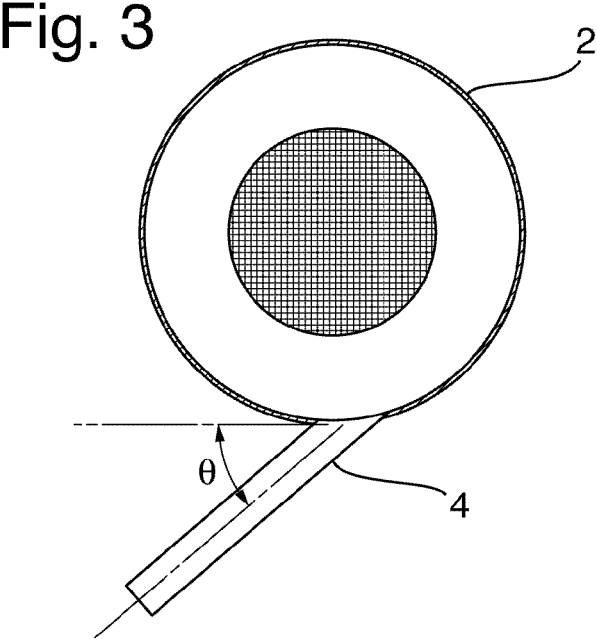
FIG. 3 shows a plan view of a cross section along line B-B, viewed from the direction indicated by arrow B', of the beverage brewing machine of FIG. 1.

Referring to FIG. 1 and FIG. 2, a first preferred embodiment of the beverage brewing machine has a brew chamber 1 delimited by a wall 2, a base 2.1, and a top portion 2.2, wherein the wall 2 extends substantially vertically from the base 2.1 to the top portion 2.2. The base 2.1 further preferably comprises an outlet port 3 which comprises a liquid permeable material. Water is supplied to the brew chamber 1 via a water inlet port 4 which is in communication with a water supply (not shown) via food grade tubing (not shown). The top portion 2.2 further preferably comprises a fluid outlet 6 which is in communication with an air pump via tubing. The base 2.1 and the top portion 2.2 are preferably removable from the wall 2 to facilitate maintenance, routine cleaning and to allow infusible materials to be introduced into the brew chamber 1. Standard fixtures known to the person skilled in the art may be employed but the base 2.1 is preferably removably attached to the wall 2 by means of a bayonet attachment or similar and the top portion 2.2 is preferably removably attached to the wall 2 by means of a hinged joint or similar. The means of attachment preferably provide water-tight and air-tight seals between the top portion 2.2 and the wall 2 and between the base 2.1 and the wall 2.

In operation, the top portion 2.2 is opened by means of the hinged joint, infusible materials, such as leaf tea, are introduced into the brew chamber 1, the top portion 2.2 is closed to form a seal with the wall 2 and the air pump is activated to extract air from the brew chamber 1 via the fluid outlet 6. Air is removed from the headspace of the brew chamber 1 at a rate that is greater than the rate at which air is able to enter the brew chamber 1 via the outlet port 3, resulting in the creation of a pressure differential between the brew chamber 1 and the external atmospheric pressure. The water supply is then activated to pump water into the brew chamber 1 via the water inlet port 4, the amount of water added being dependant on the amount and strength of the beverage desired. However, the maximum water level of the water will not rise above the position of the water inlet port 4. Due to the pressure differential created, the water is held in the brew chamber 1 while air is drawn through the outlet port 3 and passes through the brew liquor to agitate the water and infusible materials. As can be appreciated, the fluid outlet 6 is positioned above the liquid inlet 4 to avoid water being drawn into the air pump.

One of the benefits of combining a water inlet port 4 arranged to direct water around the wall 2 of the brewing chamber 1 with the air agitation means as described in the above, is that the brewing process can easily be optimised to minimise spilling and dripping of water through the outlet port 3 during filling of the container. Spilling and dripping is minimised because the water, which flows down the wall in a spiraling way is thus allowed to gently wet the infusible materials. Since too high an airflow might lead to breakdown of the infusible materials and too much foaming, it is desirable to keep the air flow as low as possible for good mixing, yet preferably without dripping or spilling, which is facilitated by a smooth influx of water along the walls. The brewing machine according to this preferred embodiment allows such a filling process.

The pressure differential is maintained until the desired strength of beverage is achieved at which point the air pump is deactivated to allow the pressure in the brew chamber to equilibrate with the atmospheric pressure and the brew liquor exits the brew chamber 1 under the effect of gravity via the outlet port 3 into a waiting vessel (not shown). Optionally, the air pump may be reversed to pump air into the brew chamber 1 to force the brew liquor out under pressure. The liquid permeable material comprising the outlet port 3 is configured such that the brew liquor is able to pass through but spent infusible materials are captured. The brew chamber is thus emptied.

However, further spent infusible materials and brew liquor residue often remain adhered to the wall 2 of the brew chamber 1. The water supply is therefore reactivated to supply a rinsing dose of water via the water inlet port 4. Effective rinsing is achieved through the arrangement of the water inlet port 4 and, referring to FIG. 3, the water inlet port 4 is arranged at an angle θ (theta) of less than 45 degrees relative to the wall 2 to direct inlet water around the wall 2 of the brew chamber 1. Preferably angle θ (theta) is less than 30 degrees, more preferably less than 15 degrees and even more preferably, the water inlet port 4 is arranged substantially tangentially to the wall 2. Most preferably the water inlet port 4 is arranged tangentially to the wall 2. In order to ensure that the water is directed around the wall 2 the inlet port 4 is arranged to direct the water in a substantially horizontal fashion into the brew chamber 1 such that the water travels along the wall 2 in a downward spiral thereby to effect rinsing. Best rinsing effect is achieved if the water flow can reach at least the major part of the inner wall 2, hence preferably the at least one water inlet port (4) is positioned proximal to the top portion of the brew chamber (1). The rinsing dose is sufficient to fill the waiting vessel to the desired level and the beverage is then ready to drink. Rinsing is even more effective when more than one water inlet ports 4 are employed and therefore the beverage brewing machine preferably comprises two or more water inlet ports 4 which may be in communication with the same, or independent, water supplies.

The base 2.1 is then detached from the wall 2 by means of the bayonet attachment, cleaned (e.g. under running water) and replaced in readiness for the next cycle of operation. In this way a beverage, preferably a tea-based beverage, is prepared efficiently and the apparatus is clean and free from residue. As such, the next operating cycle may use a different infusible material without the concern of contamination or flavour cross over.

As can be appreciated, the above described beverage brewing machine and the operation thereof provides a dramatic and effective process for the preparation of brewed beverages and therefore, in order to allow the consumer to observe the improved brew process and effective rinsing, it is preferable that at least part of the wall 2 of the brew chamber 1 is transparent, more preferably the whole of the wall 2 of the brew chamber 1 is transparent, and accordingly the wall 2 of the brew chamber 1 is preferably made of glass, perspex, pyrex, or other transparent heat resistant plastic.

Figure 4:
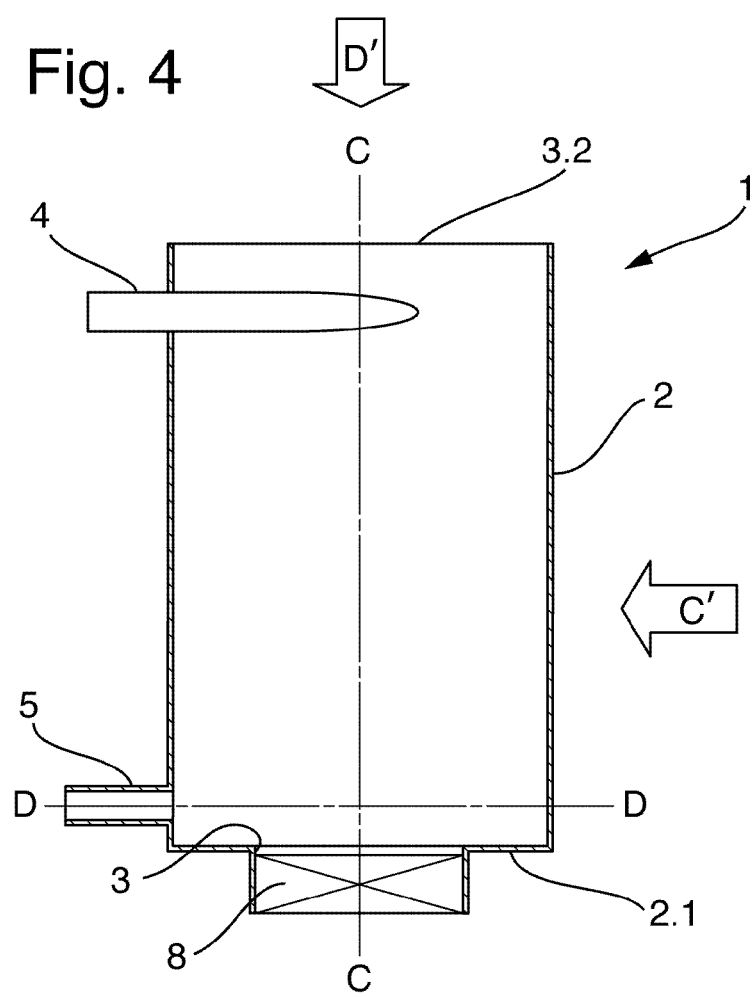
FIG. 4 shows a projection view of part of a second preferred embodiment of the beverage brewing machine of the present invention.
Figure 5:
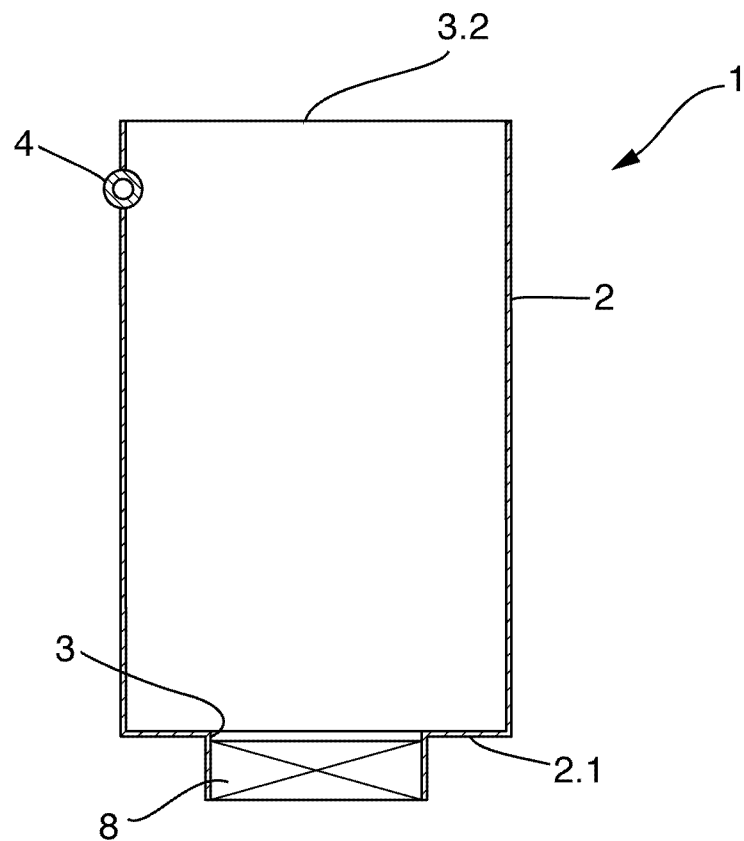
FIG. 5 shows a cross section along line C-C, viewed from the direction indicated by arrow C', of the beverage brewing machine of FIG. 4.
Figure 6:
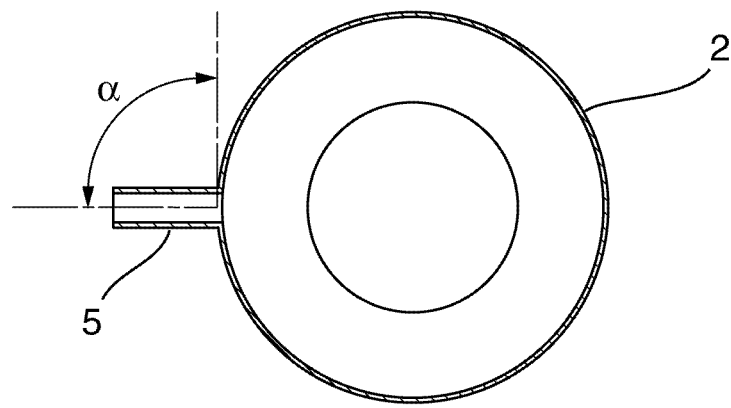
FIG. 6 shows a plan view of a cross section along line D-D, viewed from the direction indicated by arrow D', of the beverage brewing machine of FIG. 4.

A second preferred embodiment of the beverage brewing machine is shown in FIGS. 4 and 5 having a brew chamber 1 delimited by a wall 2, a base 2.1, wherein the wall 2 extends substantially vertically from the base 2.1 to an open top portion 3.2 which may be optionally enclosed, preferably with a lid (not shown). The base 2.1 further preferably comprises an outlet port 3, which preferably is controllable by a valve 8. Water is supplied to the brew chamber 1 via a water inlet port 4 (preferably positioned proximal to the top portion 3.2) and by at least one lower water inlet port 5 positioned adjacent to the base 2.1 both of which are in communication with a water supply (not shown) via food grade tubing (not shown). The water inlet port 4 and lower water inlet port 5 may be in communication with the same, or independent, water supplies. The base 2.1 and lid are preferably removable from the wall 2 to facilitate maintenance, routine cleaning and to allow infusible materials to be introduced into the brew chamber 1. Standard fixtures known to the person skilled in the art may be employed but the base 2.1 is preferably removably attached to the wall 2 by means of a bayonet attachment or similar and the lid is preferably removably attached to the wall 2 by means of a hinged joint or similar. The means of attachment preferably provide water-tight and air-tight seals between the top portion 2.2 and the wall and between the lid and the wall 2.

In operation, infusible materials, such as leaf tea, are in this second preferred embodiment preferably introduced into the brew chamber 1 via the top portion 3.2 thereby to rest upon the base 2.1 and the water supply is activated to pump water into the brew chamber 1 via the lower water inlet port 5. Preferably, a small dose of water may be introduced via the water inlet port 4 prior to the addition of water via the preferred lower water inlet port 5 in order to pre-wet the infusible materials and thereby ensure that they are able to mix with the water from the preferred lower water inlet port 5. The addition of water through the preferred lower inlet port 5 causes the infusible materials to be agitated within the flow of the water entering the brew chamber 1 proximal to the base 2.1 and brewing thus commences. In order to improve the mixing process by the optional introduction of water via the at least one lower water inlet port 5, referring to FIG. 6, the lower water inlet port 5 is arranged at an angle α (alpha) of at least 45 degrees, preferably at least 60 degrees, more preferably at least 75 degrees relative to the wall 2. More preferably the lower water inlet port 5 is arranged substantially perpendicular to the wall 2, and most preferably the lower water inlet port 5 is arranged perpendicular to the wall 2.

The amount of water added is again dependent on the amount and strength of the beverage desired however, the maximum water level of the water will not rise above the position of the water inlet port 4. When the desired volume of water has been introduced into the brew chamber the water supply is deactivated and the contents of the brew chamber 1 continue to mix and brew in the agitated water, thereby to form a brew liquor, e.g. a tea-based beverage.

By this effective mixing process an efficient brewing method can be performed, which leads to a good quality beverage in a relative short time period.

An arrangement where the angle α (alpha) is smaller than 45 degrees, especially one where the lower water inlet port 5 is substantially tangential relative to the wall 2, is less suitable, since in that case, introduction of water to the brew chamber via the inlet port 5 would result in an undesired vortex-like motion rather than turbulent agitation. Such vortex-like motion leads to less efficient agitation and mixing of the infusible materials and the water and would require a longer brewing time period.

When the desired beverage strength is achieved the optional valve 8 is opened and the brew liquor exits the brew chamber 1 under the effect of gravity via the outlet port 3 into a waiting vessel (not shown). In order to capture spent infusible materials the beverage brewing machine preferably comprises a filter (not shown) external to the brew chamber, for example positioned directly below the optional valve 8. As with the first embodiment, further spent infusible materials and brew liquor residue often remain adhered to the wall 2 of the brew chamber 1. The water supply is therefore reactivated to supply a rinsing dose of water via the water inlet port 4 as described for the first embodiment above, the rinsing dose being sufficient to fill the waiting vessel to the desired level and the beverage is then ready to drink.

The brew chamber is therefore clean and free from residue and as such, the next operating cycle may use a different infusible material without the concern of contamination or flavour cross over.

The apparatus according to the invention may also comprise an air pump and the chamber 1 may also comprise at least one fluid outlet port 6 in communication with the air pump, in combination with at least one lower water inlet port 5, positioned below the at least one inlet port 4 and arranged at an angle (alpha α) of at least 45 degrees relative to the wall 2. Preferably the inlet port 5 is arranged at an angle (alpha α) of at least 60 degrees, more preferably at least 75 degrees relative to the wall 2. More preferably the lower water inlet port 5 is arranged substantially perpendicular to the wall 2, and most preferably the lower water inlet port 5 is arranged perpendicular to the wall 2. The advantage of a set-up as described here, is that agitation of the infusible materials is effected both by air bubbles rising from outlet port 3, as well as by water from inlet port 4. In order to prevent leakage from outlet port 3, the inlet port 4 only provides water to the brewing chamber 1 when air is pulled into the brewing chamber 1 through outlet port 3.

As with the first embodiment, the above described beverage brewing machines and the operation thereof provides a dramatic and effective process for the preparation of brewed beverages and therefore, in order to allow the consumer to observe the improved brew process and effective rinsing, it is preferable that at least part of the wall 2 of the brew chamber 1 is transparent, more preferably the whole of the wall 2 of the brew chamber 1 is transparent, and accordingly the wall 2 of the brew chamber 1 is preferably made of glass, perspex, pyrex, or transparent heat resistant plastic.

With reference to FIG. 9 and as indicated before, preferably the base 2.1 is removable from the brew chamber 1. With reference to FIG. 9, in that case the base 2.1 may be formed by a cartridge 10, which preferably contains infusible material 12, and which is attachable to the bottom rim 25 of wall 2 of the brew chamber 1. This way a third preferred embodiment of the beverage brewing machine is shown. Such a cartridge 1 comprises a side wall 14 and a bottom wall 15, and is made from a water-impermeable material. The bottom wall contains at least one outlet port 3 for emptying the contents of the brew chamber 1. The outlet port 3 is comprising a filter 17. Such a cartridge 10 comprises a top rim 13 which can be connected to the bottom rim 25 of the brew chamber 1 such that a water-tight connection is made. In case of use of that cartridge 10 as a base 2.1, the cartridge will form an integral part of the brew chamber 1. As the cartridge preferably contains fresh infusible material, by connecting such a cartridge to the brew chamber 1 as base 2.1, the infusible material is introduced to the brew chamber. An optional filter external to the brew chamber as described before would not be required in case of using a cartridge 10.

By the introduction of the cartridge to the brew chamber, the cartridge becomes an integral part of the brew chamber, and it will form the base 2.1 of the brew chamber. Hence the material from which the cartridge is made has properties which are suitable to be used in connection with a brewing process. For example, if the beverage to be brewed is tea, the cartridge should be able to withstand a temperature of at least 100° C., during a period of preferably at least 10 minutes, more preferably at least 5 minutes. This requirement limits the materials which are suitable to be used for making the cartridge. For example materials like plastics which have a softening or melting point below 100° C. are not suitable as cartridge material. Additionally, the material of the cartridge may be chosen such that it does not deform when water is added to the brew chamber, in order to prevent leakage at the connection between brew chamber and cartridge. Preferably the material from which the cartridge is made comprises polypropylene (PP), such as a PP/PET laminate, preferably polypropylene homopolymer. Alternatively the cartridge comprises aluminium.

Filter 17 in the cartridge is designed such that infusible material remains in the filter when discharging the liquor, such that the beverage which is presented to the consumer is a clear liquid. Filter 17 may be made from any suitable material to withstand the conditions normally applied for brewing a beverage. For example, if the beverage to be brewed is tea, the filter should be able to withstand a temperature of at least 100° C. This requirement limits the materials which are suitable to be used for making the filter. For example materials like plastics which have a softening or melting point below 100° C. are not suitable as filter material. Materials which are suitable are for example the same as used for the cartridge wall and bottom.

The filter 17 may be an integrated part of the cartridge. For example if the cartridge is made from a plastic material and is prepared by a moulding process, the filter may be moulded as an integral part of the cartridge together with the walls and bottom of the cartridge. Preferably this means that the filter 17 may be a flat plate with holes. Alternatively the filter may be affixed into the cartridge after the walls 14 and bottom 15 have been prepared, for example by glueing a woven cloth or film to the bottom 15 to cover the opening 6. in that case the filter may be a flexible material, such as woven, non woven, or perforated film.

Most preferred, the filter 17 is integrally moulded in the cartridge, and preferably the filter material is the same as the construction material of the bottom of the cartridge. In another preferred embodiment the filter 17 is made from the same material as a regular tea bag, for example cellulose with PET/PP layer; or woven or non-woven PET.

The size of the filter openings is designed such that the filter effectively retains the spent infusible material after the brewing process. The shape of the holes in the filter may take any shape, for example channels having a square or rectangular or octagonal cross section. Alternatively the channels may be shaped as cylinders, having a circular or oval cross-section. Alternatively the holes in the filter may be channels having a coned shape, wherein the wider opening of the cone is at the inside of the filter (which is defined as the filter surface area facing the inside of the cartridge and which is in contact with the infusible material), or the other way around (wider opening at the outside of the filter). Alternatively the holes may also be shaped as a cylinder having a waist. The shape of the filter holes depends on the required flow rate of beverage, and flow conditions when discharging the beverage. Moreover the size of the filter holes may depend on the size of the infusible particulate material from which the beverage is brewed. If the infusible material has a relatively small particle size, the required size of the filter pores is relatively small as well, and vice versa. This means that the size of the filter holes preferably is between 0.1 and 1 millimeter. This may for example result in a size of the filter holes between 0.25 and 0.35 millimeter, or between 0.4 and 0.9 millimeter, or between 0.5 and 0.7 millimeter, or between 0.8 and 1.0 millimeter, or any other size within the range between and including 0.1 and 1 millimeter. The shape of the holes in the filter may be square, rectangular, circular, octagonal, or any other suitable shape. In this context, the size of the filter holes is understood to mean the largest cross-sectional dimension of a filter hole. For example, for a circular shape this means the diameter, for a square shape the length of the diagonal between two opposite corners.

The infusible material may be any suitable ingredient to brew a hot beverage. Especially suitable ingredients to be used in combination with the preferred cartridge are tea, herbs, coffee, and cocoa. Most preferred to be used as infusible materials are tea and/or herbal compositions. In addition to tea leaves and/or herbal compositions, the infusible material preferably also may contain ingredients which give a special flavour to the brewed beverage, such as spices, pieces of lemon or other fruits. The tea leafs may be flavoured, for example with bergamot oil to provide earl grey tea, or any other flavour. The tea may also be flavoured with fruit. The tea may be green tea or black tea. The herbal compositions can be used to make so-called herbal infusions. Non-limiting examples of herbal infusions are peppermint, and camomile. Also any combination of tea, herbs, fruits, and flavours is possible.

The particle size of the infusible material is chosen such that preferably a beverage can be brewed within the brewing time, and preferably such that the infusible particulate material comprises tea leaves and/or a herbal composition. Consequently the infusible material is retained on the filter when the beverage is discharged in step d) of the method according to the invention. Preferably the infusible material is reduced in size by cutting or grounding or chopping or breaking, or by any other suitable method, such that the infusible particulate material has an average particle size between 0.1 and 10 millimeter, which corresponds to a mesh size of about 150 to about 2.5. Preferably the smallest size of the infusible material corresponds to the size of the filter holes. For example, in case the filter holes have a size of about 0.6 millimeter, the infusible material has been cut to a size of at least 0.6 millimeter as well (about 28 mesh). More preferably the infusible material has been cut to a size between 1 and 8 millimeter (about 16 and 3 mesh), most preferably between 1 and 5 millimeter (about 16 and 4 mesh). Nevertheless the infusible material may contain some very fine material or dust which will be able to pass through the filter.

When using a cartridge 10 as a base 2.1, the cartridge can be combined with the optional valve 8 which will be located underneath the outlet port 3 and hence also underneath the cartridge 10. In that case a hermetically closed brew chamber is created, which then includes the contents of the cartridge 10. When optional valve 8 is opened, the brew liquor exits the brew chamber 1 under the effect of gravity via the liquid outlet 3 in the cartridge 10 into a receptacle.

Alternatively instead of using the optional valve 8, the system can be operated in the way as indicated for the first preferred embodiment of the beverage brewing machine. If the brew chamber 1 is not equipped with the optional valve 8, and a cartridge 10 is used to form the base 2.1, the system can be kept closed while brewing, by the introduction of air through the filter 17 and outlet port 3. This air can be introduced by pulling out air from the headspace of the brew chamber through opening 6 in the headspace of the brew chamber which is above the level of the liquor. This generates an underpressure in the headspace, which will be compensated by pull in of air through the filter 17 and outlet port 3. The air flow rate pulled into the brew chamber should be such that it prevents the liquor to be dripping out of the outlet port 3 before the gas flow is terminated. Consequently there is an interplay between the gas flow rate, the volume of the brew chamber, and the cross-sectional area of the filter holes. During the brewing process, air bubbles rise from the outlet port 3 to the headspace of the brew chamber 1, leading to extra agitation.

Preferably air that is drawn out of the headspace of the brew chamber, is pulled out by a gas pump that preferably is integrated in the brewing apparatus, and connected to the brew chamber by means like pipes, valves, tubes, connectors, and other equipment which is known to the skilled person. Alternatively the air is pulled out by an external gas pump.

As can be appreciated, the above described beverage brewing machine and the operation thereof provides a dramatic and effective process for the preparation of brewed beverages and therefore, in order to allow the consumer to observe the improved brew process and effective rinsing, it is preferable that at least part of the wall 2 of the brew chamber 1 is transparent, more preferably the whole of the wall 2 of the brew chamber 1 is transparent, and accordingly the wall 2 of the brew chamber 1 is preferably made of glass, perspex, pyrex, or transparent heat resistant plastic.

A transparent brew chamber (at least partly) has the advantage that the operator and consumer can observe the improved brewing process. This observation has the advantage that the consumer perceives the consumed beverage to be more special to him or her. This is compared to a similar beverage which is served to the consumer, while the consumer has not observed its brewing process, or which has been prepared in a conventional way (e.g. tea using a tea bag). By the perception of a beverage to be more special, the perceived high quality and uniqueness of the beverage is enforced. Moreover by using a transparent side wall, the operator and consumer will be reassured that the brew chamber is indeed clean after rinsing before a new brewing cycle will commence.

Figure 7A:
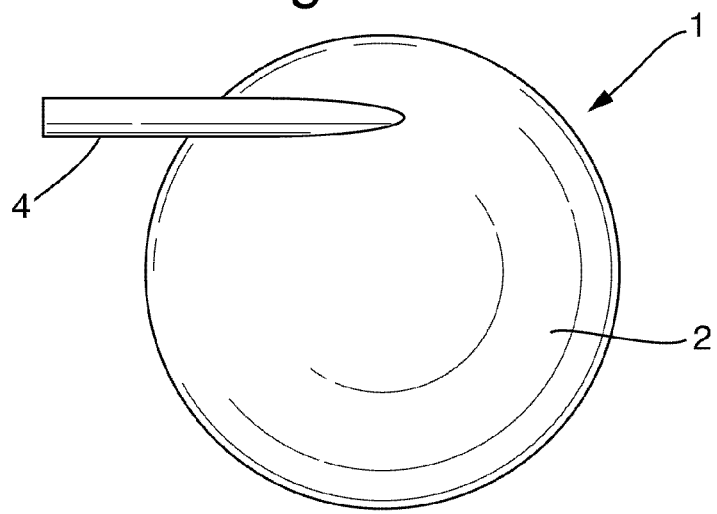
FIGS. 7a, 7b, and 7c show projection views of parts of a third, fourth and fifth preferred embodiment of the beverage brewing machine of the present invention.
Figure 7B:
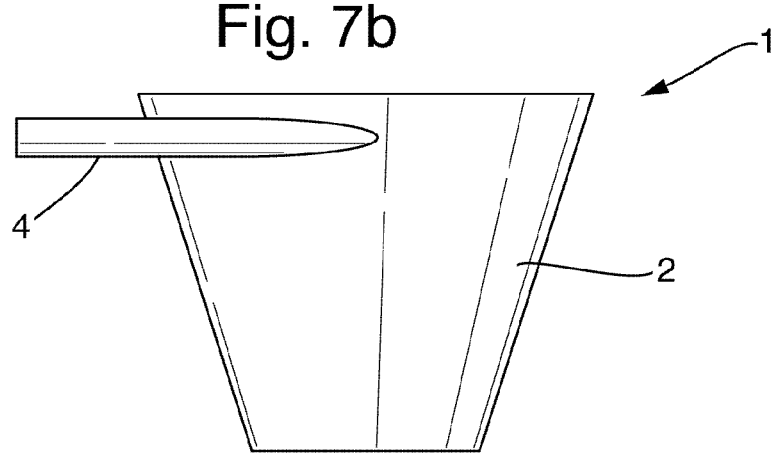
Figure 7C:
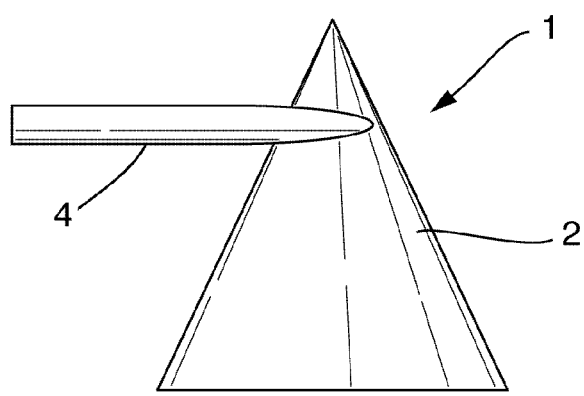
Figure 8A:
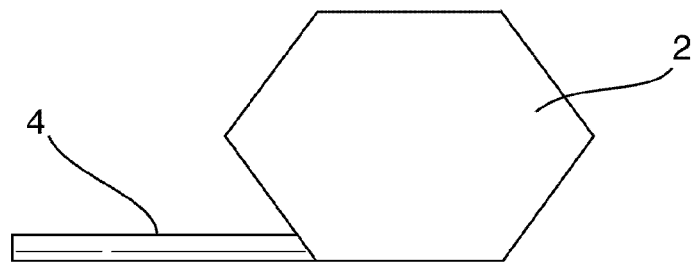
FIGS. 8a, 8b, 8c and 8d show plan views of cross sections of parts of further preferred embodiments of the beverage brewing machine of the present invention.
Figure 8B:
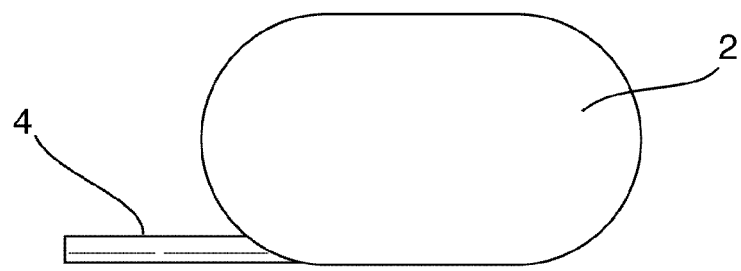
Figure 8C:
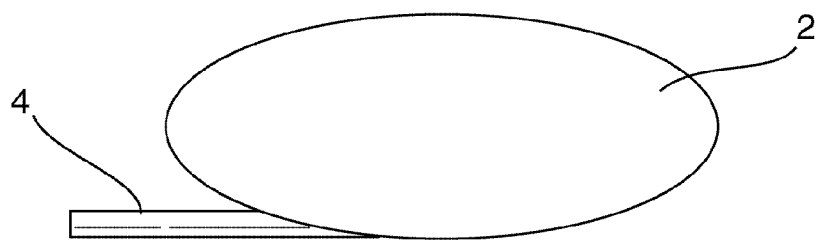
Figure 8D:
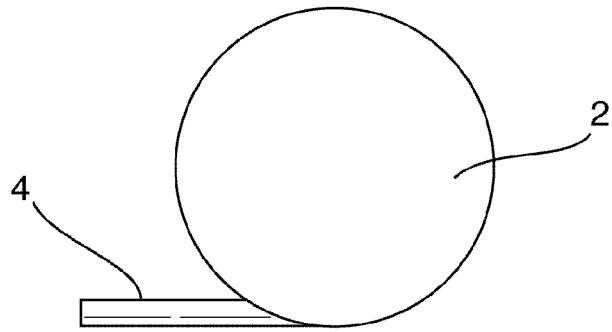

In order to allow inlet water to be directed around the wall 2 of the brew chamber 1 the beverage brewing machine preferably comprises a brew chamber 1 that is substantially cylindrical as described in the two previous embodiments above. In further preferred embodiments shown in FIG. 7 the brew chamber 1 may be, for example, spherical (FIG. 7*a*), frusto-conical (FIG. 7*b*) or conical (FIG. 7*c*). As described in the two previous embodiments above, the cylindrical brew chamber 1 has a cross section that is in the form of a circle but other configurations may be employed and therefore a cross section in the form of a regular multi-sided polygon with at least 6 sides (FIG. 8*a*) may be employed. However, it is preferred that the inner surface of the brew chamber 1 is substantially curved to allow water to flow around it and therefore a more preferred cross section is in the form of a round-edged rectangle (FIG. 8*b*), more preferably still an oval (FIG. 8*c*), even more preferably still the cross section is of a circular form (FIG. 8*d*).

In a second aspect the present invention provides a method for brewing beverages comprising the steps in the following order of:

a) introducing infusible materials into a brew chamber 1 having a wall 2;

b) supplying water to the brew chamber 1;

c) allowing the infusible materials to mix with water thereby to form a brew liquor;

d) allowing the brew liquor to empty from the brew chamber; and e) supplying a dose of water to the brew chamber 1 via the at least one water inlet port 4, characterised in that the dose of water is directed around the wall 2 thereby to rinse the brew chamber 1.

Preferably, the invention relates to a method for brewing beverages using a beverage brewing machine according to the first aspect of the invention.

In step b) water preferably is added to the brew chamber 1 via the at least one water inlet port 4. Alternatively water may be supplied to the brew chamber 1 via the at least one water inlet port 5, which preferably is present. Alternatively water may be supplied using both inlet ports 4 and 5. In a preferred embodiment in step b) water is supplied via the at least one water inlet port 5 first in order to pre-wet and agitate the infusible materials with water, followed by water supply via inlet port 4.

In step c) the infusible material is mixed with water, which may be effected by supply of water via the water inlet port 4 and/or the optional water inlet port 5.

Preferably in step d) the brew chamber 1 is emptied through an optional outlet port 3. This may be done by opening an optional valve 8.

Alternatively when air is drawn out of the headspace of the brew chamber 1 via a fluid outlet port 6, simultaneously air is drawn into the brew chamber 1 via outlet port 3 due to the creation of a pressure differential. This way in step c) the infusible material is mixed with water. When terminating the drawing of gas out of the headspace of the brew chamber 1, no air is drawn through outlet port 3, resulting into emptying of the brew chamber 1 by the flow of brewed liquor through outlet port 3 in step d). In case this method is applied, air is drawn out prior to and simultaneous with step b), and simultaneous with step c).

In case the preferably removable base 2.1 is formed by using a cartridge as described herein before, then preferably in step a) the infusible material is introduced into the brew chamber 1 by connecting a cartridge 10 containing an infusible material to the bottom rim 25 of the brew chamber 1 such that a water-tight connection is made, and wherein the cartridge comprises a side wall 14 and a bottom wall 15, and wherein the bottom wall contains at least one outlet port 3 comprising a filter 17, and wherein the cartridge is made from a water-impermeable material.

As described herein before, the brew chamber 1 can be kept free from dripping while the brewing process takes place when air is introduced into the brew chamber through outlet port 3 and filter 17 of the cartridge. In case of applying this method of keeping the brew chamber closed while brewing a liquor, the following method steps are applied to brew the beverage. After connecting a cartridge 10 (containing infusible material) to the brew chamber 1, gas is drawn out from the headspace of the brew chamber 1 via fluid outlet port 6. Simultaneously the brew chamber is filled with water in the way described herein before. As soon as water is introduced, simultaneous brewing occurs by the mixing of the infusible material and the water. The brew process is stopped by terminating drawing of gas out of the brew chamber and discharging the brewed beverage through outlet port 3. The liquor will be exiting the brew chamber under the force of gravity, and infusible material will be retained by filter 17, leading to a clear beverage which can be served to the consumer. Subsequently the rinsing step will be applied as described herein before.

In another preferred embodiment the following method for brewing a beverage is applied (when a cartridge is not used). The following steps are applied, in addition to the steps in the method according to the second aspect of the invention. Water is supplied to the brew chamber 1 wherein the brew chamber 1 comprises a base 2.1 and wherein the water is supplied via an at least one lower water inlet port 5 arranged adjacent to the base 2.1 between steps a) and b), and the step of opening a valve 8 between steps c) and d) thereby to allow the brew liquor to empty through the outlet port 3.

Preferred aspects disclosed in connection with either of the first or second aspects of the present invention may also be applicable to the other aspects of the present invention, mutatis mutandis. The various features and embodiments of the present invention, referred to in individual sections below apply, as appropriate, to other sections, mutatis mutandis. Consequently features specified in one section may be combined with features specified in other sections, as appropriate. All publications mentioned in this specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the claims.

The invention claimed is:

1. A beverage brewing machine comprising an at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply
wherein
the at least one water inlet port (4) is arranged at an angle ($\theta$ theta) of less than 45 degrees relative to the wall (2) to direct inlet water around the wall (2) of the brew chamber (1);
characterised in that
the brewing machine further comprises an air pump for extracting air from the brew chamber and the chamber (1) also comprises at least one fluid outlet port (6) in communication with the air pump, wherein the water inlet port 4 is arranged to direct the water in a substantially horizontal fashion into the brew chamber.

2. A beverage brewing machine according to claim 1 wherein the at least one water inlet port (4) is arranged substantially tangentially to the wall (2).

3. A beverage brewing machine according to claim 1, wherein the outlet port (3) is controllable by a valve (8) for emptying the brew chamber.

4. A beverage brewing machine according to claim 1 wherein a water inlet port (5) is arranged substantially perpendicular to the wall (2).

5. A beverage brewing machine according to claim 1 wherein the brew chamber (1) has a substantially curved inner surface.

6. A beverage brewing machine according to claim 1 wherein at least part of the brew chamber (1) is transparent.

7. A beverage brewing machine according to claim 1 wherein the base (2.1) is removable from the brew chamber (1).

8. A beverage brewing machine according to claim 1, wherein
a. the brewing machine further comprises at least one lower water inlet port (5), positioned below the at least one inlet port (4) and arranged at an angle (alpha $\alpha$) of at least 45 degrees relative to the wall (2).

9. The beverage brewing machine according to claim 1 wherein the water inlet port 4 is arranged to direct the water in a substantially horizontal fashion into the brew chamber such that the water travels along the wall 2 in a downward spiral to effect rinsing.

10. A method for brewing beverages comprising the steps in the following order of:
a) introducing infusible materials into a brew chamber (1) having a wall (2);
b) supplying water to the brew chamber (1) via at least one water inlet port (4);
c) allowing the infusible materials to mix with water thereby to form a brew liquor;
d) allowing the brew liquor to empty from the brew chamber; and
e) supplying a dose of water to the brew chamber (1) via the at least one water inlet port (4); characterised in that the dose of water is directed around the wall (2) thereby to rinse the brew chamber (1);
wherein the method further comprises the step of drawing air out of the headspace of the brew chamber (1) via a fluid outlet port (6), thereby simultaneously drawing air into the brew chamber (1) via outlet port (3), wherein the air is drawn out prior to and simultaneous with step (b) and simultaneous with step (c), thereby mixing the infusible material with water in step (c).

11. A method according to claim 10, using a beverage brewing machine comprising an at least one water supply, and a brew chamber (1) wherein the brew chamber (1) is delimited by a wall (2) and a base (2.1),
wherein the chamber also comprises an outlet port (3) and at least one water inlet port (4) in communication with the at least one water supply
wherein
the at least one water inlet port (4) is arranged at an angle ($\theta$ theta) of less than 45 degrees relative to the wall (2) to direct inlet water around the wall (2) of the brew chamber (1);
characterised in that
the brewing machine further comprises an air pump and the chamber (1) also comprises at least one fluid outlet port (6) in communication with the air pump.

12. A method according to claim 10, wherein the infusible material in step a) is introduced into the brew chamber 1 by connecting a cartridge (10) containing an infusible material to the bottom rim (25) of the brew chamber (1) such that a water-tight connection is made, and
wherein the cartridge comprises a side wall (14) and a bottom wall (15), and
wherein the bottom wall contains at least one outlet port (3) comprising a filter (17), and
wherein the cartridge is made from a water-impermeable material.

13. A method for brewing beverages comprising the steps in the following order of;
a) introducing infusible materials into a brew chamber (1) having a wall (2);
b) supplying water to the brew chamber (1);
c) allowing the infusible materials to mix with water thereby to form a brew liquor;

d) allowing the brew liquor to empty from the brew chamber; and e) supplying a dose of water to the brew chamber (1) via at least one water inlet port (4); characterised in that the dose of water is directed around the wall (2) thereby to rinse the brew chamber (1)

wherein the method further comprises the step of supplying water to the brew chamber (1), wherein the brew chamber (1) comprises a base (2.1), and wherein the water is supplied via an at least one lower water inlet port (5) arranged adjacent to the base (2.1) between steps (a) and (b), and the step of opening a valve (8) between steps c) and d) thereby to allow the brew liquor to empty through the outlet port (3);

wherein the lower water inlet port 5 is arranged at an angle α (alpha) of at least 45 degrees relative to the wall (2) wherein the method further comprises the step of drawing air out of the headspace of the brew chamber (1) with an air pump via a fluid outlet port (6).

14. A method according to claim 13, wherein the lower water inlet port 5 is arranged at an angle α (alpha) of at least 60 degrees, relative to the wall 2.

15. A method according to claim 13, wherein the lower water inlet port 5 is arranged perpendicular to the wall 2.

16. A beverage brewing machine comprising at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply wherein the at least one water inlet port (4) is arranged at an angle (θ theta) of less than 45 degrees relative to the wall (2)

to direct inlet water around the wall (2) of the brew chamber (1);

characterized in that the brewing machine further comprises at least one lower water inlet port (5), positioned below the at least one inlet port (4) and arranged at an angle (alpha α) of at least 45 degrees relative to the wall (2) and an air pump for extracting air from the brew chamber.

17. A beverage brewing machine according to claim 16 wherein the at least one water inlet port (4) is arranged substantially tangentially to the wall (2).

18. A beverage brewing machine according to claim 16 wherein the outlet port (3) is controllable by a valve (8) for emptying the contents of the brew chamber.

19. A beverage brewing machine according to claim 16 wherein inlet port (5) is positioned adjacent to the base (2.1).

20. A beverage brewing machine according to claim 16 wherein the water inlet port (5) is arranged substantially perpendicular to the wall (2).

21. A beverage brewing machine according to claim 16 where in the brew chamber (1) has a substantially curved inner surface.

22. A beverage brewing machine according to claim 16 wherein at least part of the brew chamber (1) is transparent.

23. A beverage brewing machine according to claim 16 wherein the base (2.1) is removable from the brew chamber (1).

24. A beverage brewing machine according to claim 23 wherein the removable base (2.0) is formed by a cartridge (1), wherein the cartridge (10) is connectable to the bottom rim (25) of the brew chamber (1) such that a water-tight connection is made, and wherein the cartridge comprises a side wall (14) and a bottom wall (15), and where in the bottom wall contains at least one outlet port (3) comprising a filter (17), and wherein the cartridge is made from a water-impermeable material.

25. A beverage brewing machine according to claim 24 wherein the cartridge (1) contains an infusible material.

26. A beverage brewing machine according to claim 16 wherein a. the brewing machine further comprises an air pump and the chamber (1) also comprises at least one fluid outlet port (6) in communication with the air pump, and b. the brewing machine further comprises at least one lower water inlet port (5), positioned below the at least one inlet port (4) and arranged at an angle (alpha α) of at least 45 degrees relative to the wall (2).

27. A beverage brewing machine comprising an at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply wherein the at least one water inlet port (4) is arranged at an angle (θ theta) of less than 45 degrees relative to the wall (2)

to direct inlet water around the wall (2) of the brew chamber (1);

characterised in that the brewing machine further comprises an air pump for extracting air from the brew chamber and the chamber (1) also comprises at least one fluid outlet port (6) in communication with the air pump, wherein a water inlet port (5) positioned adjacent to the base (2.1).

28. A beverage brewing machine comprising an at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply wherein the at least one water inlet port (4) is arranged at an angle (θ theta) of less than 45 degrees relative to the wall (2)

to direct inlet water around the wall (2) of the brew chamber (1);

characterised in that the brewing machine further comprises an air pump for extracting air from the brew chamber and the chamber (1) also comprises at least one fluid outlet port (6) in communication with the air pump wherein the base (2.1) is removable from the brew chamber (1) and wherein the removable base (2.1) is formed by a cartridge (10), wherein the cartridge (10) is connectable to the bottom rim (25) of the brew chamber (1) such that a water-tight connection is made, and wherein the cartridge comprises a side wall (14) and a bottom wall (15), and wherein the bottom wall contains at least one outlet port (3) comprising a filter (17), and wherein the cartridge is made from a water-impermeable material.

29. A beverage brewing machine according to claim 28, wherein the cartridge (10) contains an infusible material.

30. A beverage brewing machine comprising an at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply wherein the at least one water inlet port (4) is arranged at an angle (θ theta) of less than 45 degrees relative to the wall (2) to direct inlet water around the wall (2) of the brew chamber (1);

characterised in that the brewing machine further comprises an air pump for extracting air from the brew chamber and the chamber (1) also comprises at least one fluid outlet port (6) in communication with the air pump wherein the brewing machine further comprises at least one lower water inlet port (5), positioned below the at least one inlet port (4) and arranged at an angle (alpha α) of at least 45 degrees relative to the wall (2).

31. A beverage brewing machine comprising an at least one water supply, and a brew chamber (1) wherein the brew chamber (1) is delimited by a wall (2) and a base (2.1), wherein the chamber also comprises an outlet port (3) and at least one water inlet port (4) in communication with the at least one water supply wherein the at least one water inlet port (4) is arranged at an angle (θ theta) of less than 45 degrees relative to the wall (2) to direct net water around the wall (2) of the brew chamber (1);

characterised in that the brewing machine further comprises an air pump for extracting air from the brew chamber and the chamber (1) also comprises at least one fluid outlet port (6) in communication with the aft pump where the brewing machine further comprises at least one lower water inlet port (5), positioned below the at least one inlet port (4) and arranged at an angle (alpha α) of at least 45 degrees relative to the wall (2).

* * * * *